United States Patent Office 3,323,060
Patented May 30, 1967

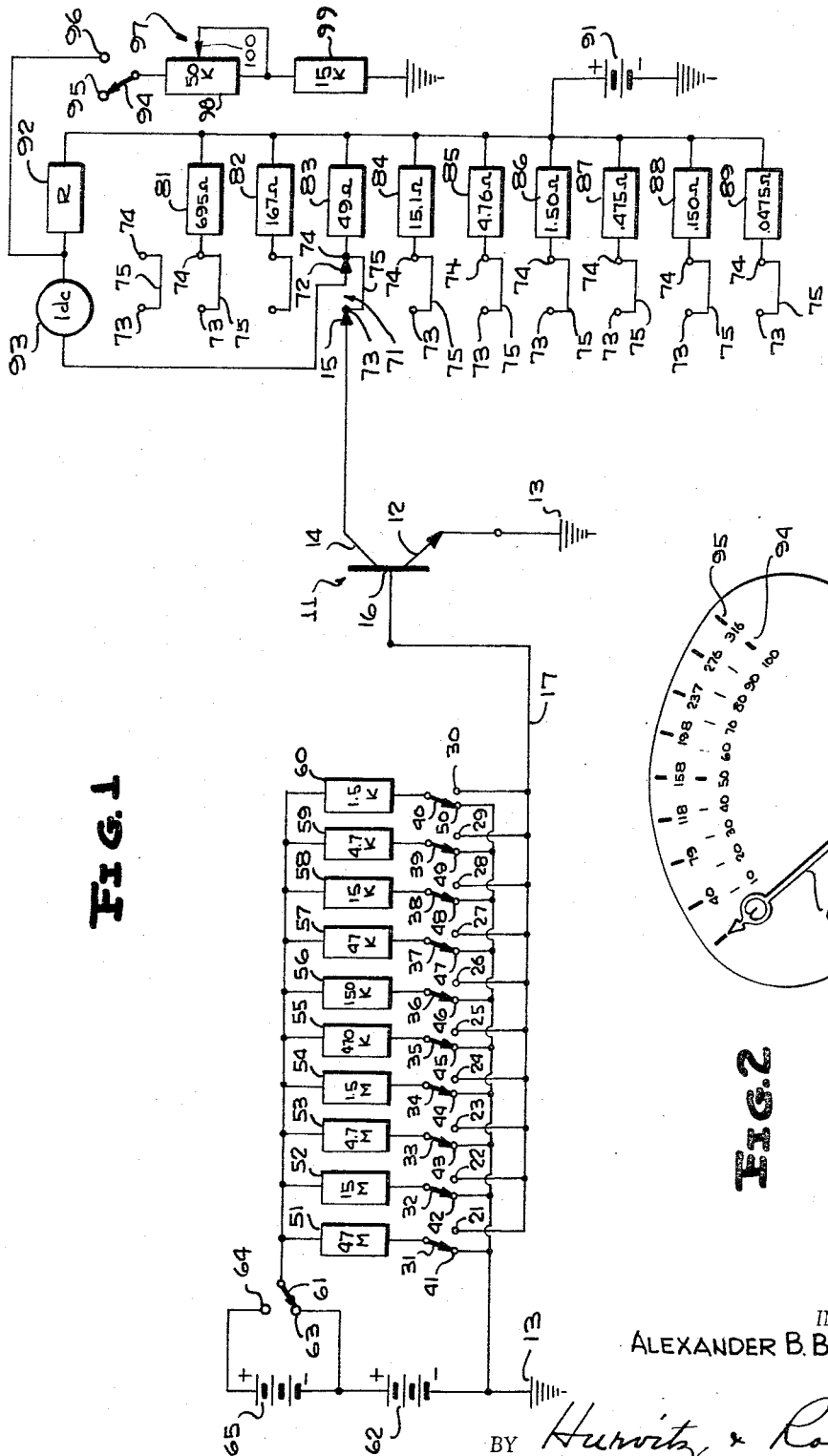

3,323,060
TRANSISTOR TEST SET HAVING INPUT
CURRENTS RELATED TO $10^{n/2}$
Alexander B. Bereskin, 452 Riddle Road,
Cincinnati, Ohio 45231
Continuation of application Ser. No. 201,939, June 12,
1962. This application May 6, 1966, Ser. No. 548,335
3 Claims. (Cl. 324—158)

This is a continuation of application Ser. No. 201,939 filed June 12, 1962.

The present invention relates generally to transistor testing equipment and more particularly to a transistor test set for measuring dynamic and/or D.C. current amplification factors with the use of a direct reading meter.

The need presently exists for transistor test equipment wherein current amplification factors, and particularly the Beta amplification factors, may be obtained without calculations of any nature. In prior test sets, the D.C. amplification factor is generally obtained by insertion of a separate meter in the transistor input and output circuits. The current flowing in these circuit is read and the ratio between them computed to ascertain the transistor D.C. current amplification factor. To determine the dynamic amplification factor, an A.C. current is inserted in the input and the resulting A.C. output current is read. The ratio between the A.C. output and input currents is then computed to obtain the desired result. As an alternative, bridge circuits have been used to null the resulting A.C. output current against the A.C. input current, with dynamic Beta being computed from the bridge settings. These approaches are extremely time consuming, thus expensive, and lead to many errors due to calculation mistakes.

The present invention provides a transistor test set in which the current amplification factors may be read directly from a single current reading meter. In a system for the measurement of dynamic and D.C. Beta amplification factors, the meter is connected in the transistor collector-emitter circuit and accurately controlled currents are applied to the base. The currents are controlled by variable resistances which are fed by a constant voltage source. In a preferred embodiment, the meter is a 0–100 microampere movement and includes a pair of scales, one having a range of $10^{4/2}$ (0–100) and the other a range of $10^{5/2}$ (0–316). This meter is furnished with a multiplicity of shunts which are decimally related to the two scales so that direct Beta readings over very wide ranges for many types of transistors are possible. The input currents are limited to values which are decimal multiples of $10^{n/2}$, where $n$ is any positive integer, except that provisions are also made for doubling the values of the input currents. With this choice of meter scales and shunts, and restricted values of input currents, for every input current selected there is a numerical value on the meter scale which is decimally related to the current amplification factor, except that when the input current has been doubled the numerical value on the scale is twice the value decimally related to the current amplification factor.

To measure the dynamic Beta factor, a balancing circuit is connected to the meter. A D.C. current having a value related to $10^{n/2}$ is applied to the transistor base circuit and the meter reading is set to zero by the balancing circuit. The base current is now increased by an increment related to $10^{n/2}$. Virtually all of the increased collector current flows through the meter circuit so that a direct indication of the dynamic amplification factor is obtainable.

As an added feature, the flexibility of the present system is increased, if necessary, by doubling the magnitude of the input current. This is accomplished by doubling the input voltage which supplies the base current through the current controlling resistors. The feature of increasing the base current by a factor of two provides the same number of test points, and approximately the same values of currents, as would be available if the input current were controlled according to the factor of $10^{n/4}$ but does so with only one half as many input current controlling circuits. By using a voltage doubling arrangement, the necessity for a complex resistor control circuit and switching arrangement is avoided. To ascertain amplification factor with the larger input voltage applied to the system, it is merely necessary to halve the meter reading, a simple mental calculation.

It is accordingly an object of the present invention to provide a new and improved transistor test set by which current amplification factor may be easily determined.

It is another object of the present invention to provide a transistor test set wherein both dynamic and D.C. current amplification factors may be directly read from a single meter.

A further object of the present invention is to provide a transistor test set wherein currents related to $10^{n/2}$ are applied to the input circuit of a transistor and a current measuring meter having a first full scale reading of $10^{n_1/2}$, where $n_1$ is an even integer, and a second full scale reading of $10^{n_2/2}$, where $n_2$ is an odd integer, is provided.

An additional object is to provide a transistor test set for determining current amplification factors wherein the input current is selectively related to $10^{n/2}$ or approximately to $10^{n/4}$; the selection being achieved by merely doubling the supply voltage for the input current.

Yet another object of the present invention is to provide an accurate transistor test set for ascertaining dynamic and D.C. Beta current amplification factors with minimum effort on the part of an operator; minimum number of components; and hence minimum initial and operating expenses.

The above and still further objects, features and advantages of the present invention will become apparent upon consideration of the following detailed description of one specific embodiment thereof, especially when taken in conjunction with the accompanying drawings, wherein:

FIGURE 1 is a circuit diagram of a preferred embodiment of the invention; and

FIGURE 2 is a diagram of a meter dial used in the circuit of FIGURE 1.

Reference is now made to FIGURE 1 of the drawings which discloses NPN transistor 11, the transistor to be tested for D.C. and dynamic Beta amplification factors. Transistor 11, connected in the common emitter mode, has its emitter 12 connected to ground 13, its collector 14 connected to switch contact 15, and its base 16 connected to lead 17.

Connected to lead 17 are ten different switch contacts 21–30, which are adapted to engage switch armatures 31–40, respectively. Armatures 31–40 normally are spring biased on contacts 41–50, respectively, which are connected to ground 13. Connected to armatures 31–40 are ten input current control resistors 51–60 which are all connected to switch armature 61 which normally couples the positive terminal of D.C. power supply 62 to the resistors via contact 63. Armature 61 can be switched to engage contact 64 and thereby double the voltage to resistors 51–60 by coupling the series connected supplies 62 and 65 in the circuit.

In a preferred embodiment of the invention, each of the supplies 62 and 65 is a 47.2 volt D.C. source and resistors 51–60 are 47 megohms, 15 megohms, 4.7 megohms, 1.5 megohms, 470 kilohms, 150 kilohms, 47 kilohms, 15 kilohms, 4.7 kilohms and 1.5 kilohms, respectively. Thus, the currents flowing through resistors 51–60 are 1.0 microampere, 3.16 microamperes, 10 microamperes, 31.6 microamperes, 100 microamperes, 0.316 milliampere, 1.00 milliampere, 3.16 milliamperes, 10 milliamperes and 31.6 milliamperes, respectively. These currents are equal to $10^{n/2}$ microamperes, where $n$ is any integer between 0 and 9. Positioning of any of the armatures 31 to 40 on contacts 21–30 results in an input current to base 16 corresponding with that through the associated resistance. By positioning armature 61 on contact 64, the current through each of the resistors 51–60 is doubled and results in control of the input current as a function of approximately $10^{n/4}$. By utilizing this arrangement optimum selection of input currents in achieved with a minimum number of components.

Connected in the collector circuit of transistor 11 is switch 71, including ganged armatures 15 and 72 which are adapted to engage contacts 73 and 74, respectively. Each of the ten pairs of contacts 73 and 74 is connected directly together by strapping 75 so that the meter is protected from carrying full collector current in case of defective switch contacts. Connected to nine of the contacts 74 are resistors 81–89, the other contact being open circuited. Resistors 81–89 have one terminal connected to the positive terminal of D.C. supply 91, the other terminal of which is grounded.

Connected between the positive terminal of supply 91 and armature 72 is a series circuit including current limiting resistor 92 and D.C. microammeter 93. Microammeter 93 preferably has a full scale deflection of 100 microamps and includes two scales. As illustrated in FIGURE 2, microammeter 93 includes needle 90 and scales 94 and 95 which extend between 0–100 and 0–316, respectively.

To provide the proper calibration for meter 93, the meter and resistor 92 have a total series resistance of 1.5 kilohms. Meter shunting resistors 81–89 have values of 695 ohms, 167 ohms, 49 ohms, 15.1 ohms, 4.76 ohms, 1.50 ohms, 0.475 ohm, 0.150 ohm, and 0.0475 ohm, respectively which result in full scale deflections of 0.316, 1.00, 3.16, 10.0, 31.6, 100, 316, 1000, and 3160 milliamperes for the different resistance values. Of course, when armatures 15 and 72 engage the open circuit set of contacts 73 and 74, the full scale meter deflecton is 0.100 milliamps.

For dynamic Beta measurements, armature 94 is moved from open contact 95 to contact 96 so that the balancing circuit 97 is connected between meter 93 and resistor 92. Circuit 97 includes a balancing variable resistance 98, which has one of its terminals connected to armature 94; its other terminal and slider 100 are connected to current limiting resistor 99. The impedance of balancing circuit 97 is sufficiently high so that substantially all of the incremental collector current will flow through meter 93 once balance is achieved.

To measure $I_{CEO}$, the transistor collector-emitter current with an open circuit base electrode, switch 71 is set to the position required to read the current through meter 93 and each of the switches 31–40 is maintained in its normal position, engaging contacts 41–50. With the selection of collector currents available with switches 71, it is possible to measure characteristics of transistors ranging between low signal silicon and power germanium. Of course for testing of even higher power elements, additional taps may be included in switch 71.

The manner in which the present circuit is utilized to ascertain D.C. Beta factor, $h_{FE}$, will now be described. Selector switch 71 is positioned at the desired or expected range, and a single one of switches 31–40 is activated to engage its respective contact 21–30 to cause the desired value of collector current to flow. To determine the proper Beta range the following table of Beta range as a function of base input resistance and full scale deflection of meter 93 is consulated:

TABLE 1

| Beta Range | Collector Current Range, ma. | | | | | | | | | |
|---|---|---|---|---|---|---|---|---|---|---|
| 31.6 | | .100 | .316 | 1.00 | 3.16 | 10.0 | 31.6 | 100 | 316 | 1,000 |
| 100 | .100 | .316 | 1.00 | 3.16 | 10.0 | 31.6 | 100 | 316 | 1,000 | 3,160 |
| 316 | .316 | 1.00 | 3.16 | 10.0 | 31.6 | 100 | 316 | 1,000 | 3,160 | |
| 1,000 | 1.00 | 3.16 | 10.0 | 31.6 | 100 | 316 | 1,000 | 3,160 | | |
| Base Series Resistance | 47 M. | 15 M. | 4.7 M. | 1.5 M. | 470 K. | 150 K. | 47 K. | 15 K. | 4.7 K. | 1.5 K. |

The column associated with each of the base resistors 51–60 is preferably positioned in proximity with its respective switch activating button.

To illustrate the manner in which the table is utilized, it is assumed that armature 35 is brought into engagement with contact 25, switch 71 is connected to resistor 83, and needle 90 points to 50 on scale 94 and 158 on scale 95. The connection of switch 71 with resistor 83 produces a full scale current of 3.16 milliamperes in meter 93. The intersection of 470K and 3.16 is consulted and Beta range is read from the left column as 31.6. Since needle 90 reads 158 on scale 95, the D.C. Beta factor is then read as 15.8. As a further illustration it is assumed the 4.7 megohm resistor 53 is connected in the base circuit, switch 71 is connected to resistor 82 which provides for a full scale reading of 1.00 milliampere and needle 90 is deflected so that readings of 25 and 79 are made on scales 94 and 95, respectively. The intersection of 4.7M and 1.00 is found on the table to correspond with a Beta range of 100. The D.C. Beta amplification is thus found to be 25.

If it is desired to determine the amplification factor at intermediate base current values, the input current is doubled by engaging switch 61 with contact 64 so that supply 65 is introduced into the circuit. This results in a deflection of needle 90 over what it normally would be for the corresponding input or base resistance. The meter reading is thus divided by two to ascertain Beta with great simplicity.

To measure dynamic Beta factor, $h_{fe}$, single pole, double throw switch 94 is operated to engage contact 96. While maintaining the base current at the same value as it was during measurement of $h_{fe}$, the slider of rheostat 98 is rotated to produce a null reading on meter 93. The base current is increased by switching in parallel a higher resistance into the base circuit while maintaining the original resistance in the circuit. This results in additional collector current and a deflection of needle 90. Substantially all of the increased current flows through the shunt resistors 81–89 of meter 93 and through meter 93 and resistor 92 due to the relatively high impedance of the balancing circuit so that an accurate indication of the current increment is obtained from the meter reading. The deflection of meter 93 is an accurate measurement of the dynamic Beta factor. The above table is utilized by consulting the base resistance column associated with the additional resistance. Otherwise, the table is utilized to determine dynamic Beta factor in the same manner as it is used for D.C. Beta.

While I have described and illustrated one specific embodiment of my invention, it will be clear that variations of the details of construction which are specifically illustrated and described may be resorted to without departing from the true spirit and scope of the invention as defined in the appended claims.

I claim:
1. In a circuit for measuring D.C. and dynamic cur- rent amplification factor of a transistor under test, and collector-emitter current with base open, the combination comprising means for connecting said transistor in common emitter operational mode in said circuit; first means for supplying direct current; a first plurality of electrical resistance elements; switch means for selectively applying current from said first direct current supply means to the base electrode of said transistor via any one or more of said resistance elements to supply incrementally variable base current to said transistor; said first means for supplying direct current including a first constant voltage source and a second constant voltage source, said voltage sources being of the same voltage values, and switch means for selectively connecting one of said constant voltage sources or both of said constant voltage sources in series to provide said current; said first plurality of resistance elements having resistance values selected to restrict incremental variation of said base current to current values within the set $10^{n/2}$ current units, where $n$ is an integer, $0 \leq n \leq 9$; said values of voltages and resistances being such that current applied to said base electrode of said transistor has values integrally related to $10^{n/2}$; second means for supplying direct current; an ammeter having two scales reading 0–100 and 0–316, respectively, means, including a current limiting resistor connecting said ammeter to said second direct current supply means in series circuit; a second plurality of electrical resistance elements; means for selectively connecting any one of said second plurality of resistance elements in parallel circuit with said ammeter; and means for connecting said series circuit and the parallel circuit to the collector electrode of said transistor; said second plurality of resistance elements having resistance values selected to provide different full-scale deflection ranges for collector current, on each of said plurality of scales, commensurate with the incrementally variable current values to which said base current is restricted.

2. The combination according to claim 1 further including a balance circuit for adjustably reducing the current flow through said ammeter, said balance circuit including a variable resistance selected to provide said balance circuit with a much higher impedance than that of the ammeter circuit path; and means for selectively connecting said balance circuit to said ammeter and in parallel circuit with said current limiting resistor and said second direct current supply means.

3. The combination according to claim 2 wherein said first plurality of electrical resistance elements have values, respectively, of 1.5K, 4.7K, 15K, 47K, 150K, 470K, 1.5M, 4.7M, 15M and 47M and wherein said second plurality of resistance elements have values .0475Ω, .150Ω, .1475Ω, 1.50Ω, 4.76Ω, 15.1Ω, 49Ω, 167Ω, 695Ω.

References Cited

Electronic Industries (Sylvan), October 1958, pp. 90–92.

Radio-Electronics (Bernard), vol. 33, No. 4, April 1962, pp. 42–44.

WALTER L. CARLSON, *Primary Examiner.*

E. L. STOLARUN, *Assistant Examiner.*